(12) United States Patent
Goode et al.

(10) Patent No.: US 8,130,662 B1
(45) Date of Patent: Mar. 6, 2012

(54) METHOD AND APPARATUS FOR PROVIDING TRANSCODING IN A NETWORK

(75) Inventors: Burwell Goode, Weston, CT (US); Min Lu, Freehold, NJ (US); Leopold Strahs, Williamsburg, VA (US)

(73) Assignee: AT&T Intellectual Property II, L.P., Atlanta, GA (US)

( * ) Notice: Subject to any disclaimer, the term of this patent is extended or adjusted under 35 U.S.C. 154(b) by 738 days.

(21) Appl. No.: 11/618,894

(22) Filed: Dec. 31, 2006

(51) Int. Cl.
*G01R 31/08* (2006.01)
*G06F 11/00* (2006.01)
*H04L 12/28* (2006.01)
*H04L 12/56* (2006.01)

(52) U.S. Cl. .................... 370/252; 370/395.21; 370/401

(58) Field of Classification Search ........................ None
See application file for complete search history.

(56) References Cited

U.S. PATENT DOCUMENTS 7,002,919 B1 * 2/2006 El-Sayed ..................... 370/252
(Continued)

*Primary Examiner* — Chirag Shah
*Assistant Examiner* — Ashley Shivers

(57) ABSTRACT

A method and apparatus for providing a centralized or regionalized transcoding function are disclosed. For example, the method detects a codec mismatch during a call setup between a calling party endpoint device and a called party endpoint device. The method then invokes a transcoding function directly by at least one border element (BE) to handle the detected mismatch, where the transcoding function is performed by at least one centralized or regionalized transcoding server and at least one media resource.

20 Claims, 6 Drawing Sheets

U.S. PATENT DOCUMENTS

| | | | |
|---|---|---|---|
| 7,103,008 B2 * | 9/2006 | Greenblat et al. | 370/258 |
| 7,447,160 B1 * | 11/2008 | Croak et al. | 370/242 |
| 2003/0172257 A1 * | 9/2003 | Greenblat et al. | 712/234 |
| 2003/0195991 A1 * | 10/2003 | Masel et al. | 709/251 |
| 2005/0083912 A1 * | 4/2005 | Afshar et al. | 370/352 |
| 2006/0052126 A1 * | 3/2006 | Choksi | 455/518 |
| 2006/0146792 A1 * | 7/2006 | Ramachandran et al. | 370/352 |
| 2006/0168323 A1 * | 7/2006 | Kim et al. | 709/238 |
| 2006/0253538 A1 * | 11/2006 | Jung et al. | 709/206 |
| 2007/0086582 A1 * | 4/2007 | Tai et al. | 379/114.01 |
| 2007/0213078 A1 * | 9/2007 | Shaheen | 455/466 |
| 2007/0283048 A1 * | 12/2007 | Theimer et al. | 709/246 |

* cited by examiner

METHOD AND APPARATUS FOR PROVIDING TRANSCODING IN A NETWORK

The present invention relates generally to communication networks and, more particularly, to a method and apparatus for providing centralized or regionalized transcoding in communication networks, e.g., packet networks such as Voice over Internet Protocol (VoIP) networks.

BACKGROUND OF THE INVENTION

As the number of services using packet-based communication networks has grown, the variety of codecs in use has grown as well. There is a need for packet-based service interoperability, and consequently a need for endpoints to communicate without regard to the vendor or service supplying the endpoints. If the endpoints are designed to support several codecs, then codec negotiation can increase the likelihood of being able to communicate with other endpoints. Nevertheless, the proliferation of codec types exceeds the practical capability of endpoints to offer all needed codecs at a reasonable cost. For voice services, calls between services using different codecs can be routed through the PSTN, but only at increased cost and reduced quality of service. Hence transcoding has become an important challenge for VoIP and multimedia networks. There are other solutions to address the need for transcoding, e.g., on board dedicated transcoding resource at the border elements and so on. However, these may not be practical (e.g. expensive or not available for some service providers).

Therefore, a need exists for a method and apparatus for providing centralized or regionalized transcoding in a packet network, e.g., a VoIP network.

SUMMARY OF THE INVENTION

In one embodiment, the present invention discloses a method and apparatus for providing a centralized or regionalized transcoding function after a codec mismatch error is received. For example, the method detects a codec mismatch during a call setup between a calling party endpoint device and a called party endpoint device. The method then invokes a transcoding function directly by at least one border element (BE) to handle the detected mismatch, where the transcoding function is performed by at least one transcoding server and at least one transcoding device.

BRIEF DESCRIPTION OF THE DRAWINGS

The teaching of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION

Figure 1:
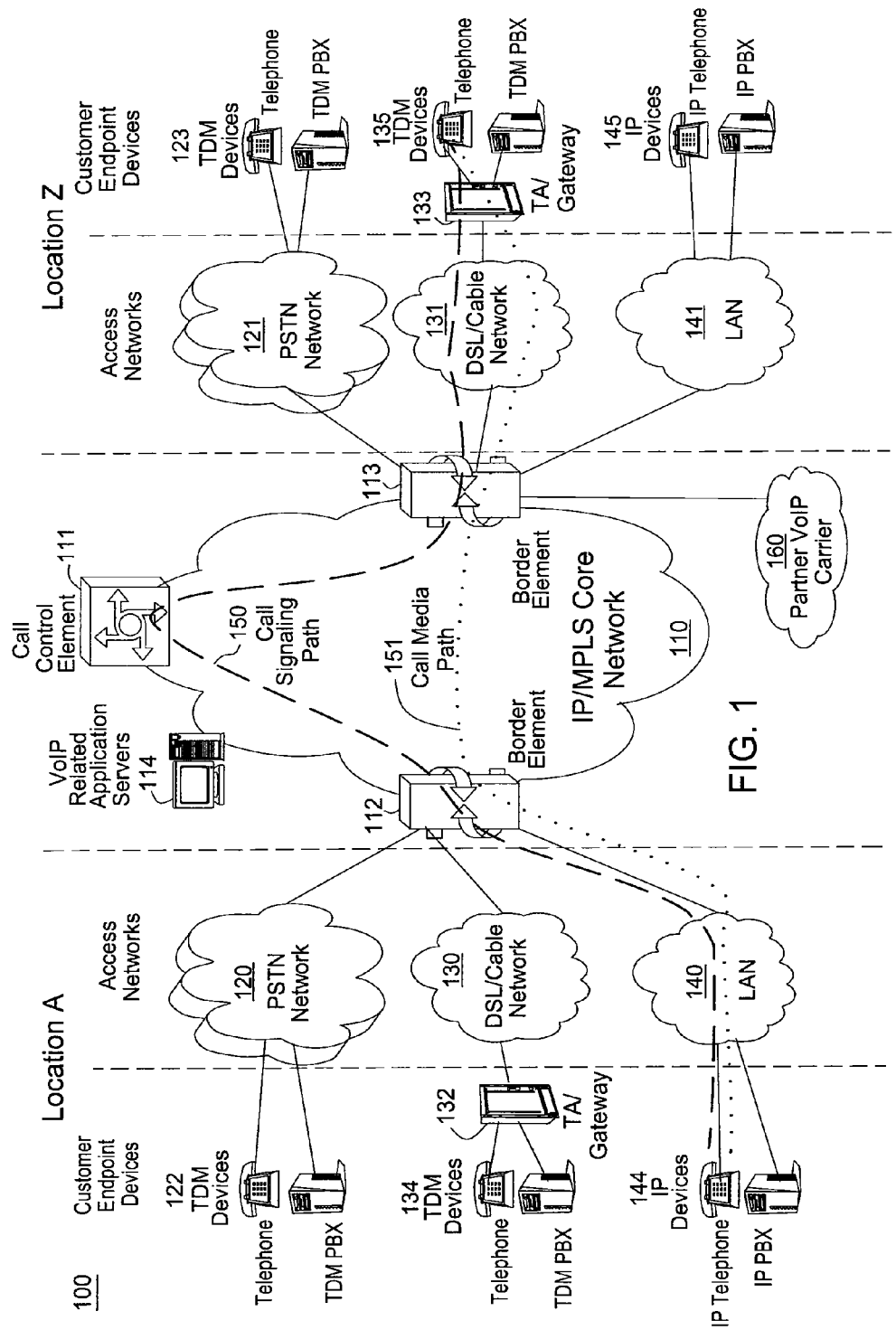
FIG. 1 illustrates an exemplary Voice over Internet Protocol (VoIP) network related to the present invention.

To better understand the present invention, FIG. 1 illustrates a communication architecture 100 having an example network, e.g., a packet network such as a VoIP network related to the present invention. Exemplary packet networks include internet protocol (IP) networks, asynchronous transfer mode (ATM) networks, frame-relay networks, and the like. An IP network is broadly defined as a network that uses Internet Protocol to exchange data packets. Thus, a VoIP network, a SoIP (Service over Internet Protocol) network, or an IMS (IP Multimedia Subsystem) network is built on an IP network.

In one embodiment, the VoIP network may comprise various types of customer endpoint devices connected via various types of access networks to a carrier (a service provider) VoIP core infrastructure over an Internet Protocol/Multi-Protocol Label Switching (IP/MPLS) based core backbone network. Broadly defined, a VoIP network is a network that is capable of carrying voice signals as packetized data over an IP network. The present invention is described below in the context of an illustrative VoIP network. Thus, the present invention should not be interpreted to be limited by this particular illustrative architecture.

The customer endpoint devices can be either Time Division Multiplexing (TDM) based or IP based. TDM based customer endpoint devices 122, 123, 134, and 135 typically comprise of TDM phones or Private Branch Exchange (PBX). IP based customer endpoint devices 144 and 145 typically comprise IP phones or IP PBX. The Terminal Adaptors (TA)/Gateway 132 and 133 are used to provide necessary interworking functions between TDM customer endpoint devices, such as analog phones, and packet based access network technologies, such as Digital Subscriber Loop (DSL) or Cable broadband access networks. TDM based customer endpoint devices access VoIP services by using either a Public Switched Telephone Network (PSTN) 120, 121 or a broadband access network via a TA/Gateway 132 or 133. IP based customer endpoint devices access VoIP services by using a Local Area Network (LAN) 140 and 141 with a router 142 and 143, respectively.

The access networks can be either TDM or packet based. A TDM PSTN 120 or 121 is used to support TDM customer endpoint devices connected via traditional phone lines. A packet based access network, such as Frame Relay, ATM, Ethernet or IP, is used to support IP based customer endpoint devices via a customer LAN, e.g., 140 with a router 142. A packet based access network 130 or 131, such as DSL or Cable, when used together with a TA/Gateway 132 or 133, is used to support TDM based customer endpoint devices.

The core VoIP infrastructure comprises of several key VoIP components, such the Border Element (BE) 112 and 113, the Call Control Element (CCE) 111, and VoIP related Application Servers (AS) 114. The BE resides at the edge of the VoIP core infrastructure and interfaces with customers endpoints over various types of access networks. A BE is typically implemented as a Media Gateway or a Session Border Controller and performs signaling, media control, security, and call admission control and related functions. The CCE resides within the VoIP infrastructure and is connected to the BEs using the Session Initiation Protocol (SIP) over the underlying IP/MPLS based core backbone network 110. The CCE is typically implemented as a Media Gateway Controller, a softswitch, or a Call Session Control Function in an IMS network and performs network wide call control related functions as well as interacts with the appropriate VoIP service related servers when necessary. The CCE functions is a signaling endpoint for all call legs between all BEs and the CCE. The CCE may need to interact with various VoIP related Application Servers (AS) in order to complete a call that require certain service specific features, e.g. call waiting, call forwarding, voice mail, etc.

Calls that originate or terminate in a different carrier can be handled through the PSTN 120 and 121 or the Partner IP Carrier 160 interconnections. Originating or terminating TDM calls can be handled via existing PSTN interconnections to the other carrier. Originating or terminating VoIP calls can be handled via the Partner IP carrier interface 160 to the other carrier.

In order to illustrate how the different components operate to support a VoIP call, the following call scenario is used to illustrate how a VoIP call is setup between two customer endpoints. A customer using IP device 144 at location A places a call to another customer at location Z using TDM device 135. During the call setup, a setup signaling message is sent from IP device 144, through the LAN 140, the Router 142, and the associated packet based access network, to BE 112. BE 112 will then send a setup signaling message, such as a SIP-INVITE message if SIP is used, to CCE 111. CCE 111 looks at the called party information and queries the necessary VoIP service related application server 114 to obtain the information to complete this call. In one embodiment, the Application Server (AS) functions as a SIP back-to-back user agent. If BE 113 needs to be involved in completing the call; CCE 111 sends another call setup message, such as a SIP-INVITE message if SIP is used, to BE 113. Upon receiving the call setup message, BE 113 forwards the call setup message, via broadband network 131, to TA/Gateway 133. TA/Gateway 133 then identifies the appropriate TDM device 135 and rings that device. Once the call is accepted at location Z by the called party, a call acknowledgement signaling message, such as a SIP 200 OK response message if SIP is used, is sent in the reverse direction back to the CCE 111. After the CCE 111 receives the call acknowledgement message, it will then send a call acknowledgement signaling message, such as a SIP 200 OK response message if SIP is used, toward the calling party. In addition, the CCE 111 also provides the necessary information of the call to both BE 112 and BE 113 so that the media exchange can proceed directly between BE 112 and BE 113. The call signaling path 150 and the call media path 151 are illustratively shown in FIG. 1. Note that the call signaling path and the call media path are different because once a call has been setup up between two endpoints, the CCE 111 does not need to be in the media path for actual direct media exchange.

Note that a customer in location A using any endpoint device type with its associated access network type can communicate with another customer in location Z using any endpoint device type with its associated network type as well. For instance, a customer at location A using IP customer endpoint device 144 with packet based access network 140 can call another customer at location Z using TDM endpoint device 123 with PSTN access network 121. The BEs 112 and 113 are responsible for the necessary signaling protocol translation, e.g., SS7 to and from SIP, and media format conversion, such as TDM voice format to and from IP based packet voice format. Note that the descriptions provided so far apply to scenarios with both endpoint devices supporting the same type of codec.

The transcoding issue in VOIP networks is always a challenge for service providers because of the wide variety of codecs offered by different network elements and service providers. Therefore, a need exists for a method and apparatus for providing efficient transcoding in a packet network, e.g., a VoIP network.

To address this criticality, the present invention enables Border Elements to invoke a centralized or regionalized transcoding function without invoking an Application Server (AS) after an error code, e.g., a Session Initiation Protocol (SIP) error code 606, is received. Given the fact that BEs are always in the call signaling and the call media path, the present invention does not require an additional element to be added for a call if the call requires transcoding. The transcoding function will only be invoked as needed for calls with mismatched codecs. Comparing with the option of always engaging AS for all calls, the present invention renders the use of an Application Server (AS) optional during call setup in VoIP networks when codec mismatch needs to be handled; hence, the processing load on the VoIP network and the AS is greatly reduced.

Some benefits of the present invention are:
 centralizing or regionalizing transcoding resource sharing to more efficiently use DSP resources;
 invoking transcoding function on a as-need basis;
 minimizing impact on the existing network elements and call flows;
 applicable to both ingress and egress Border elements.

Figure 2:
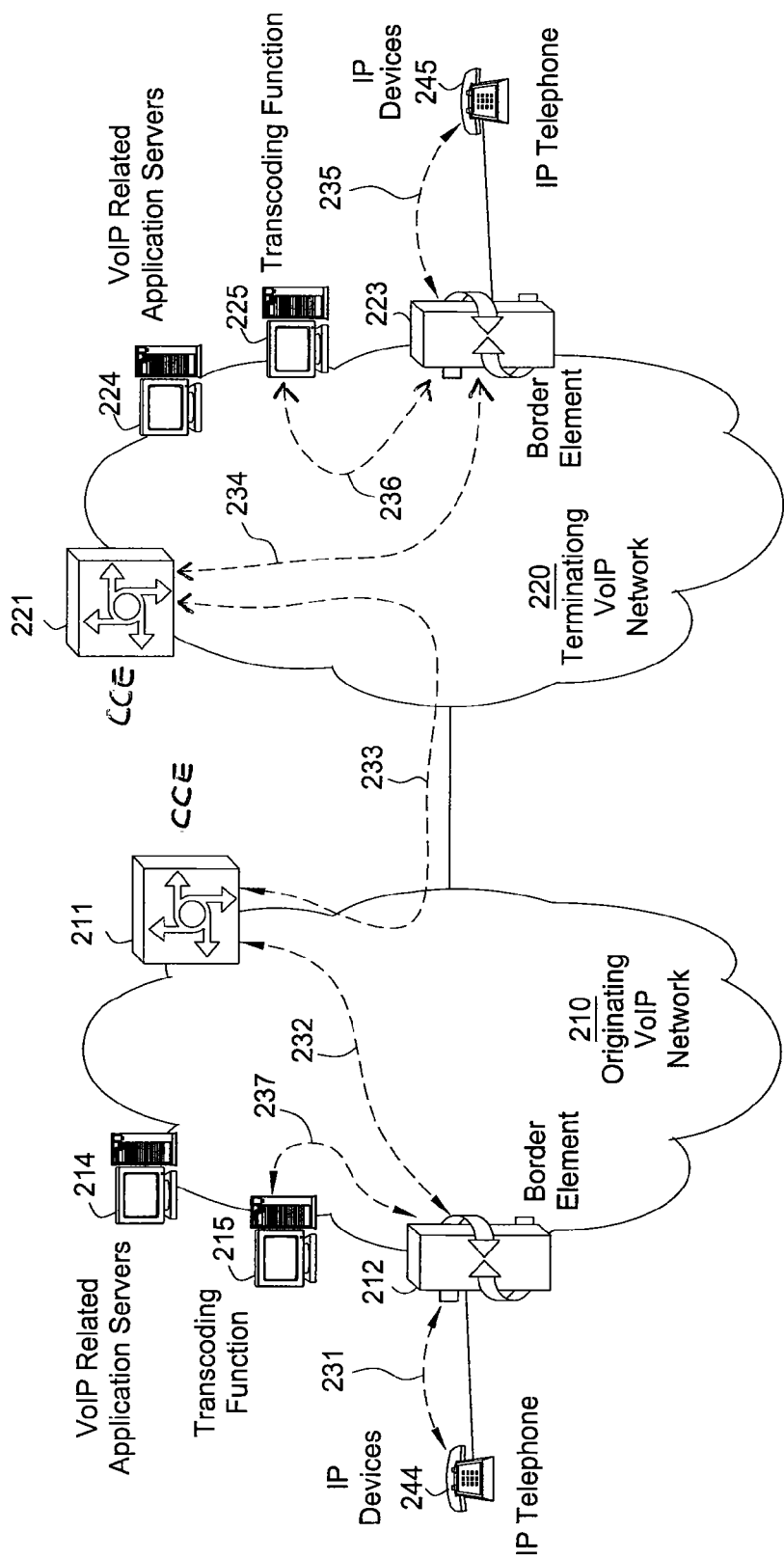
FIG. 2 illustrates an example of centralized and regionalized transcoding invoked by a Border Element in a packet network, e.g., a VoIP network, of the present invention.

FIG. 2 illustrates an example of a network 200 having centralized or regionalized transcoding invoked by a Border Element in accordance with the present invention. For example, a call is originated from a VoIP endpoint device 244 to a VoIP endpoint device 245 and there is a mismatch of codec between the two endpoints. Therefore, transcoding is required to support this call. Endpoint 244 is served by originating VoIP network 210 and endpoint 245 is served by terminating VoIP network 220. A simplified version will be a single network that performs both the originating side of processing and the terminating side of processing. The call setup related messages are exchanged between endpoint 244 and endpoint 245 via BE 212, CCE 211, CCE 221, and BE 223 using signaling flows 231 through 235.

In one embodiment, when a SIP 606 error message is received by BE 223 from endpoint 245 via flow 235, BE 223 can invoke the transcoding function 225 using flow 236 to request the required transcoding resource to successfully complete the call. Note that AS 224 is not involved in requesting the required transcoding function 225 at all. The transcoding function is invoked directly by the terminating BE in this scenario.

In another embodiment, when a SIP 606 error message is received by BE 212 from endpoint 245 via flow 235 through 232, BE 212 can invoke the transcoding function 215 using flow 237 to request the required transcoding resource to successfully complete the call. Note that AS 214 is not involved in requesting the required transcoding function 215 at all. The transcoding function is directly invoked by the originating BE in this scenario.

Figure 3:
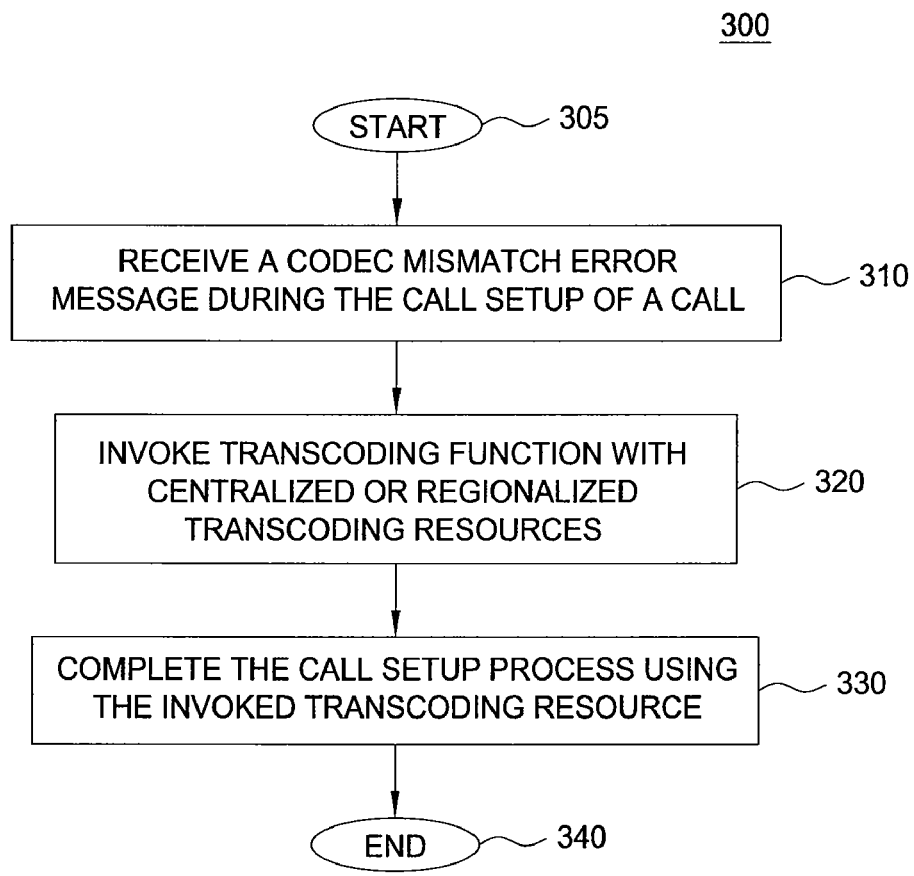
FIG. 3 illustrates a flowchart of a method for providing centralized or regionalized transcoding invoked by a Border Element in a packet network, e.g., a VoIP network, of the present invention.

FIG. 3 illustrates a flowchart of a method 300 for providing centralized or regionalized transcoding invoked by a Border Element in a VoIP network of the present invention. The method can be executed by either the originating BE or the terminating BE involved in a call setup process. Method 300 starts in step 305 and proceeds to step 310.

In step 310, the method receives a codec mismatch error message, e.g., SIP 606 error message. For example, the SIP 606 error message is sent by a called party in response to a codec mismatch occurrence. For instance, the calling party may request to use only the G.726 codec but the called party can only support the G.729 codec, then a codec mismatch occurs and results in the sending of the SIP 606 error message.

In step 320, the method invokes the transcoding function with centralized or regionalized transcoding function. In particular, the method invokes a centralized or regionalized transcoding server which, in turn, further invokes a media resource to support the necessary transcoding of a call. The term centralized or regionalized transcoding function collectively includes both the centralized or regionalized transcoding server and the media resource. The centralized or regionalized transcoding server provides the control function of the transcoding service while the media resource performs the actual transcoding between two different codecs. Note that transcoding performed by a media resource can be applied to audio, video, or multimedia codec mismatch.

In step 330, the method completes the call setup process using the invoked centralized or regionalized transcoding function. When a call is successfully completed or setup, the invoked centralized or regionalized transcoding function is used to support the necessary transcoding of the call. The method ends in step 340.

Figure 4:
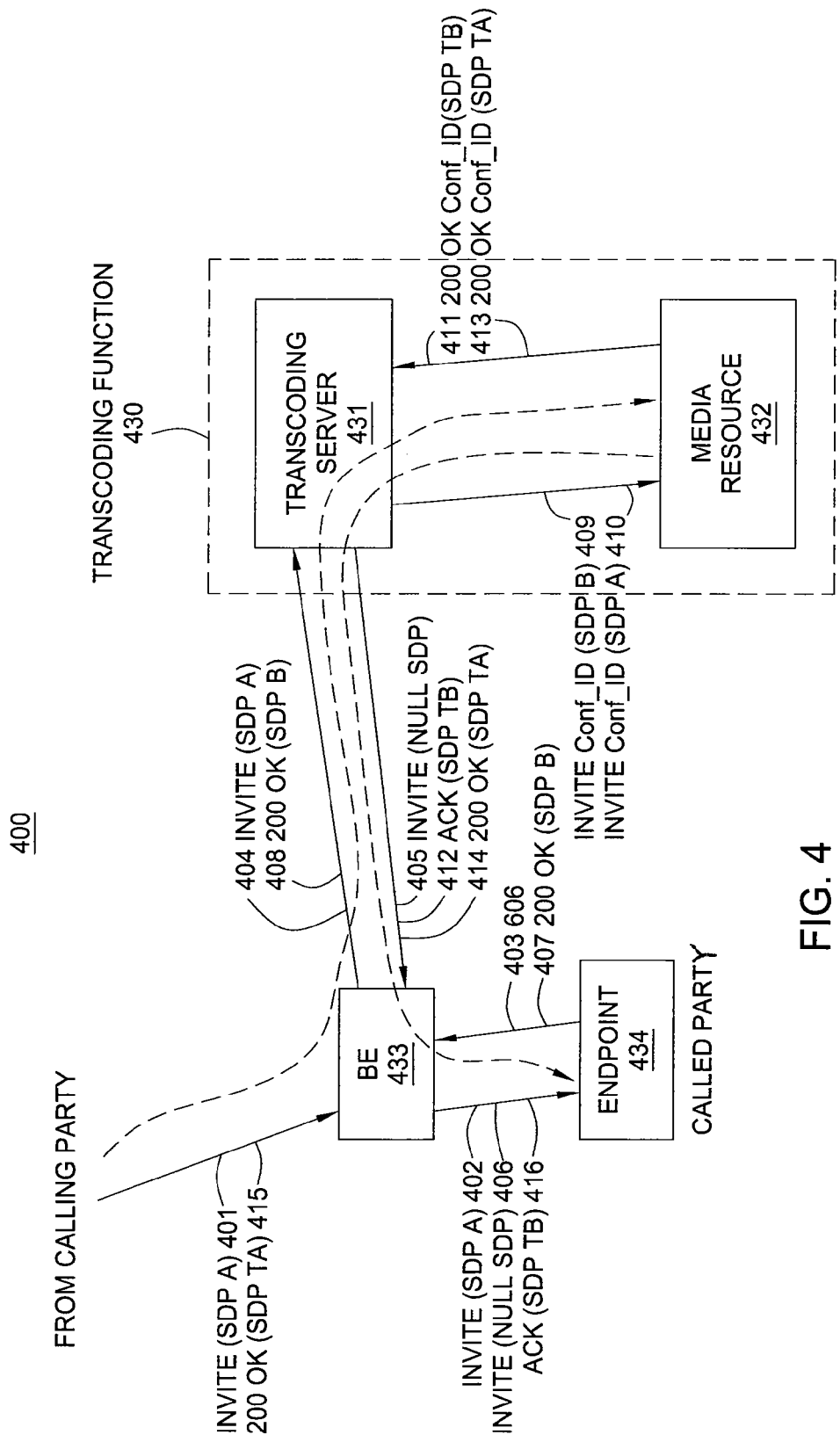
FIG. 4 illustrates an example call flow for providing centralized or regionalized transcoding invoked by a terminating Border Element in a packet network, e.g., a VoIP network, of the present invention.

FIG. 4 illustrates an example call flow 400 for providing centralized or regionalized transcoding invoked by a terminating Border Element in a VoIP network of the present invention.

In flow 401, a SIP INVITE call setup message reaches the terminating BE 433. In flow 402, the SIP INVITE call setup message reaches the called party B with endpoint 434 from terminating BE 433. The SIP INVITE message contains codec offer for the calling party A in the Session Description Protocol (SDP).

In flow 403, called party B detects the mismatched codec scenario and sends a SIP 606 error message back to BE 433. In flow 404, BE 433 invokes the transcoding function by redirecting the original SIP INVITE message to a centralized or a regionalized transcoding function 430.

In flow 405, flow 406, flow 407, flow 408, flow 409, flow 411, flow 412, and flow 416, transcoding server 431 in Transcoding Function 430 performs the third party call control function (3PCC) and initiates a new call leg between the called party and a media resource 432.

In flow 410, flow 413, flow 414, and flow 415, transcoding server 431 in Transcoding Function 430 performs the third party call control function (3PCC) and link the existing calling party call leg to the media resource 432.

Thus, two call media path segments with support of different codec are set up for this call, e.g., between the calling party and media resource 432, and between media resource 432 and the called party. Transcoding is controlled by transcoding server 431 and performed using media resource 432.

Figure 5:
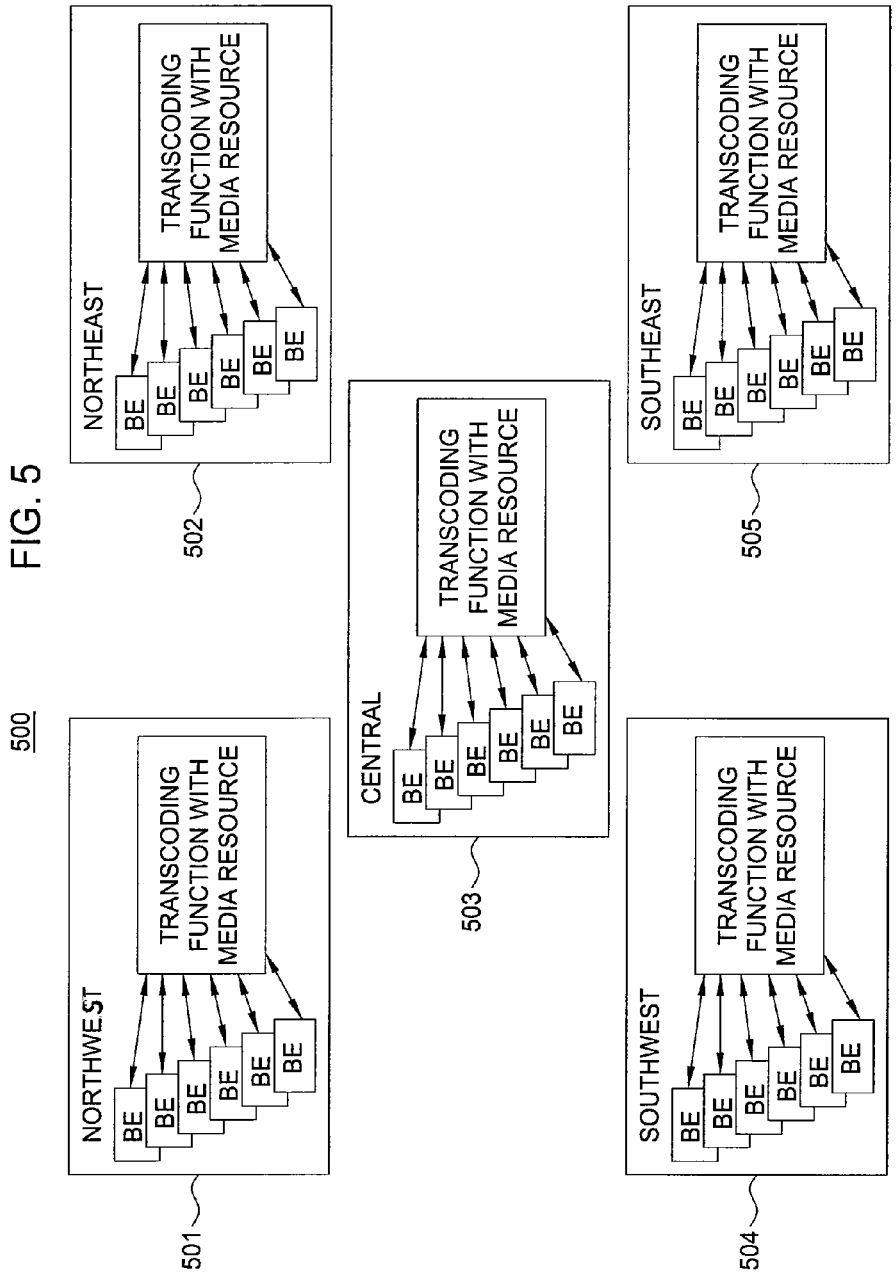
FIG. 5 illustrates an example of regionalizing transcoding function in a packet network, e.g., a VoIP network, of the present invention.

FIG. 5 illustrates an example 500 of regionalizing transcoding function in a VoIP network of the present invention. When all transcoding functions and resources are centralized in a single location, there may be a drawback of adding delay in the call media path for the calls the require transcoding. With the growth of the network size and the amount of traffic that requires transcoding, the centralized transcoding approach can be easily migrated to a regionalized approach by dividing subsets of BEs into regions to be associated with the region's own transcoding function. This can reduce the delay introduced between the BE invoking the transcoding function and the transcoding function itself without sacrificing the benefits of cost-effective centralized transcoding resources sharing within the network.

In FIG. 5, in one particular scenario, the overall transcoding function resources in a network is divided into 5 different regions, e.g., region 501 for the northwest, region 502 for the northeast, region 503 for the central, region 504 for the southwest and region 505 for the southeast of the United States. Each region has its own transcoding function with media resources, supporting a particular associated subsets of BEs within the overall network. One main advantage of centralizing or regionalizing transcoding function is to facilitate more efficient upgrade of transcoding related resources. For example, when transcoding function upgrade is needed, it can be performed in a centralized or a regionalized fashion without needing to upgrade each individual BE separately.

Note that the media resources used by the transcoding function can be shared with other services, such as conferencing, IVR, etc.

Figure 6:
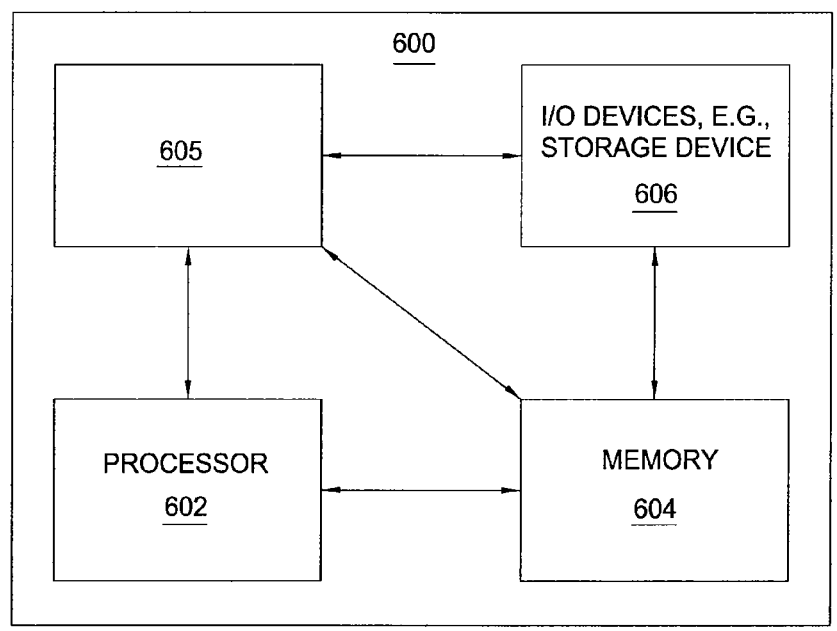
FIG. 6 illustrates a high level block diagram of a general purpose computer suitable for use in performing the functions described herein.

FIG. 6 depicts a high level block diagram 600 of a general purpose computer suitable for use in performing the functions described herein. As depicted in FIG. 6, the system 600 comprises a processor element 602 (e.g., a CPU), a memory 604, e.g., random access memory (RAM) and/or read only memory (ROM), a module 605 for providing centralized or regionalized transcoding, and various input/output devices 606 (e.g., storage devices, including but not limited to, a tape drive, a floppy drive, a hard disk drive or a compact disk drive, a receiver, a transmitter, a speaker, a display, a speech synthesizer, an output port, and a user input device (such as a keyboard, a keypad, a mouse, and the like)).

It should be noted that the present invention can be implemented in software and/or in a combination of software and hardware, e.g., using application specific integrated circuits (ASIC), a general purpose computer or any other hardware equivalents. In one embodiment, the present module or process 605 for providing centralized or regionalized transcoding can be loaded into memory 604 and executed by processor 602 to implement the functions as discussed above. As such, the present process 605 for providing centralized or regionalized transcoding (including associated data structures) of the present invention can be stored on a computer readable medium or carrier, e.g., RAM memory, magnetic or optical drive or diskette and the like.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method for providing a transcoding function in a communication network, comprising:
   detecting a codec type mismatch during a call setup between a calling party endpoint device and a called party endpoint device, wherein the codec type mismatch is detected when a codec mismatch message is received by a border element, wherein the border element is situated at an edge of the communication network, wherein the border element comprises a session border controller; and
   invoking a transcoding function directly by the border element to handle the codec type mismatch that is detected, wherein the transcoding function is performed by a transcoding server and a media resource.

2. The method of claim 1, wherein the communication network is an Internet protocol network.

3. The method of claim 1, wherein the border element comprises a terminating border element servicing the call setup.

4. The method of claim 1, wherein the media resource comprises a plurality of media resources.

5. The method of claim 1, wherein the invoking comprises:
   sending a transcoding request directly by the border element to the transcoding server to establish a transcoding process; and
   establishing a first call media path between the calling party and the media resource and a second call media path between the called party and the media resource.

6. The method of claim 5, wherein the first and second call media paths are established by the transcoding server.

7. The method of claim 1, wherein the transcoding server is located separately from the border element.

8. The method of claim 1, wherein the transcoding server and the media resource are regionalized into a plurality of locations.

9. The method of claim 1, wherein the border element comprises an originating border element servicing the call setup.

10. The method of claim 1, wherein the transcoding server and the media resource are centralized at a single location.

11. A non-transitory computer-readable storage medium having stored thereon a plurality of instructions, the plurality of instructions including instructions which, when executed by a processor, cause the processor to perform a method for providing a transcoding function in a communication network, comprising:
    detecting a codec type mismatch during a call setup between a calling party endpoint device and a called party endpoint device, wherein the codec type mismatch is detected when a codec mismatch message is received by a border element, wherein the border element is situated at an edge of the communication network, wherein the border element comprises a session border controller; and
    invoking a transcoding function directly by the border element to handle the codec type mismatch that is detected, wherein the transcoding function is performed by a transcoding server and a media resource.

12. The non-transitory computer-readable storage medium of claim 11, wherein the communication network is an internet protocol network.

13. The non-transitory computer-readable storage medium of claim 11, wherein the border element comprises a terminating border element servicing the call setup.

14. The non-transitory computer-readable storage medium of claim 11, wherein the media resource comprises a plurality of media resources.

15. The non-transitory computer-readable storage medium of claim 11, wherein the invoking comprises:
    sending a transcoding request directly by the border element to the transcoding server to establish a transcoding process; and
    establishing a first call media path between the calling party and the media resource and a second call media path between the called party and the media resource.

16. The non-transitory computer-readable storage medium of claim 15, wherein the first and second call media paths are established by the transcoding server.

17. The non-transitory computer-readable storage medium of claim 11, wherein the transcoding server is located separately from the border element.

18. The non-transitory computer-readable storage medium of claim 11, wherein the transcoding server and the media resource are regionalized into a plurality of locations.

19. A system for providing a transcoding function in a communication network, comprising:
    a transcoding server and a media resource for performing a transcoding function; and
    a border element, coupled to the transcoding server, for detecting a codec type mismatch during a call setup between a calling party endpoint device and a called party endpoint device, and for directly invoking the transcoding function to handle the detected codec type mismatch, wherein the codec type mismatch is detected when a codec mismatch message is received by the border element, and wherein the border element is situated at an edge of the communication network, wherein the border element comprises a session border controller.

20. The system of claim 19, wherein the communication network is an Internet protocol network.

\* \* \* \* \*